United States Patent [19]

Hurter

[11] 4,288,363
[45] Sep. 8, 1981

[54] NOVEL AZO DYES HAVING 2-AMINO-5-AMINOMETHYL-7-SULFO NAPHTHALENE COUPLING MOIETY

[75] Inventor: Rudolf Hurter, Basel, Switzerland

[73] Assignee: Ciba-Geigy Corporation, Ardsley, N.Y.

[21] Appl. No.: 23,514

[22] Filed: Mar. 23, 1979

[30] Foreign Application Priority Data

Apr. 3, 1978 [CH] Switzerland .................. 3537/78

[51] Int. Cl.³ .................... C09B 29/00; C09B 63/00
[52] U.S. Cl. .................... 260/155; 260/156; 260/162; 260/193; 260/194; 260/196
[58] Field of Search .............. 260/196, 155, 156, 162, 260/193, 194

[56] References Cited

U.S. PATENT DOCUMENTS

| | | | |
|---|---|---|---|
| 3,808,194 | 4/1974 | Piller | 260/196 |
| 4,049,704 | 9/1977 | Jager | 260/196 |
| 4,126,609 | 11/1978 | Jager | 260/153 |
| 4,145,340 | 3/1979 | Ridyard | 260/196 |

Primary Examiner—John F. Niebling
Attorney, Agent, or Firm—Edward McC. Roberts; John P. Spitals

[57] ABSTRACT

Dyestuff intermediates of the formula

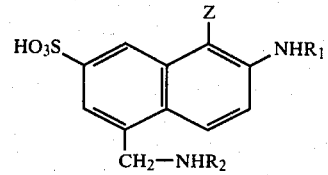

wherein $R_1$ represents hydrogen, an alkyl radical of 1 to 8 carbon atoms or a phenyl radical, $R_2$ represents hydrogen or an acyl radical and Z represents hydrogen or a sulfo group, and the use thereof for the manufacture of azo dyes of the formula

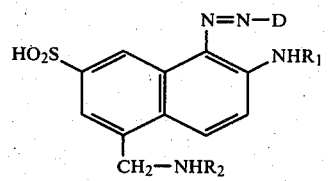

wherein D represents the radical of a coupling component, $R_1$ represents hydrogen, an alkyl radical of 1 to 8 carbon atoms or a phenyl radical, and $R_2$ represents hydrogen or an acyl radical, or of azo dyes of the formula

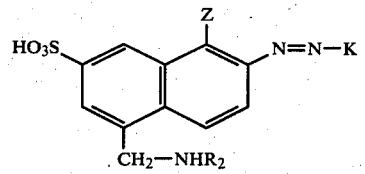

wherein K is the radical of a coupling component, Z represents hydrogen or the sulfo group, and $R_2$ represents hydrogen or an acyl radical.

6 Claims, No Drawings

NOVEL AZO DYES HAVING 2-AMINO-5-AMINOMETHYL-7-SULFO NAPHTHALENE COUPLING MOIETY

The invention relates to compounds of the formula

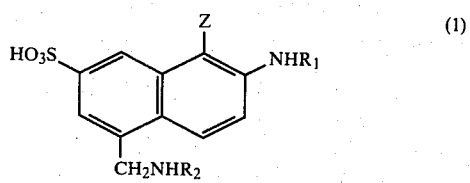

(1)

wherein $R_1$ represents hydrogen, an alkyl radical of 1 to 8 carbon atoms or a phenyl radical, $R_2$ represents hydrogen, a non-reactive or fibre-reactive acyl radical, and Z represents hydrogen or a sulfo group, the use of said compounds both as coupling and diazo components in the synthesis of azo dyes, and also the novel azo dyes obtained therewith.

Those compounds of the formula (1), wherein Z represents the sulfo group, are of particular interest. Desulfonation of these compounds yields the compounds of the formula (1), wherein Z represents hydrogen.

$R_1$ as an alkyl radical of 1 to 8 carbon atoms can be both straight chain and branched and is for example the methyl, ethyl, n-propyl, isopropyl, n-butyl, sec-butyl and tert-butyl radical, a linear or branched pentyl, hexyl, heptyl or octyl radical. These alkyl radicals can also be substituted, for example by phenyl. Such radicals are for example aralkyl radicals, such as the benzyl radical.

$R_1$ as a phenyl radical is preferably unsubstituted or substituted by the customary substituents of azo dyes. These substituents are for example sulfonamide groups which are unsubstituted or mono- or disubstituted at the nitrogen atom, alkylamino groups, arylamino groups, alkyl groups which are unsubstituted or substituted by phenyl or halogen, for example the trifluoromethyl group; the nitro, cyano and hydroxyl group; alkoxy groups, such as the methoxy and ethoxy group; azo groups and halogen atoms, such as fluorine, chlorine or bromine atoms.

$R_2$ as an acyl radical represents for example the radical of the formula —COR,

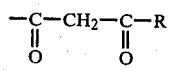

or —SO$_2$R, wherein R represents an alkyl radical, such as the methyl, ethyl, n-propyl or isopropyl radical or the butyl radical, or an aryl radical, for example the phenyl radical, which can be further substituted in addition by an alkyl radical.

An acyl radical $R_2$ is to be understood as meaning a radical which contains one or more reactive groups or removable substituents in the molecule which are able to react for example with the hydroxyl groups of cellulosic materials in the presence of acid acceptors and, with or without the action of heat, with the NH groups of natural polyamide fibres, such as wool, to form covalent bonds. A great number of such fibre-reactive groups are known from the literature.

Specific examples are: mono- or dihalogeno-symmetrical triazinyl radicals, for example 2,4-dichlorotriazinyl-6, 2-amino-4-chlorotriazinyl-6, 2-alkylamino-4-chloro-triazinyl-6, such as 2-methylamino-4-chlorotriazinyl-6, 2-ethylamino- or 2-propylamino-4-chlorotriazinyl-6, 2-β-oxoethylamino-4-chlorotriazinyl-6, 2-di-β-oxoethylamino-4-chlorotriazinyl-6 and the corresponding sulphuric acid hemiesters, 2-diethylamino-4-chlorotriazinyl-6, 2-morpholino- or 2-piperidino-4-chloro-triazinyl-6, 2-cyclohexylamino-4-chlorotriazinyl-6, 2-arylamino- and substituted arylamino-4-chlorotriazinyl-6, such as 2-phenylamino-4-chlorotriazinyl-6-, 2-(o-, m- or p-carboxy- or sulfophenyl)-amino-4-chlorotriazinyl-6, 2-alkoxy-4-chloro-triazinyl-6, such as 2-methoxy- or -ethoxy-4-chlorotriazinyl-6, 2-(phenylsulfonylmethoxy)-4-chlorotriazinyl-6, 2-aryloxy- and substituted aryloxy-4-chlorotriazinyl-6, such as 2-phenoxy-4-chlorotriazinyl-6, 2-(p-sulfophenyl)-oxy-4-chlorotriazinyl-6, 2-(o-, m- or p-methyl- or -methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethyl-mercapto-4-chlorotriazinyl-6, 2-phenyl-mercapto-4-chlorotriazinyl-6, 2-(4'-methylphenyl)-mercapto-4-chlorotriazinyl-6, 2-(2',4'-dinitro)-phenylmercapto-4-chlorotriazinyl-6, 2-methyl-4-chlorotriazinyl-6 and the 2-phenyl-4-chlorotriazinyl-6 radical.

Particularly interesting radicals Z are fluoro-1,3,5-triazine radicals of the formula

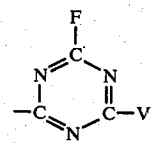

wherein the substituent V at the triazine ring can be in particular a radical of a primary, secondary and tertiary amine, such as —NH$_2$, —NHCH$_3$, —NHC$_2$H$_5$, —N(CH$_3$)$_2$, —N(C$_2$H$_5$)$_2$, —NHC$_2$H$_4$OH, —N(C$_2$H$_4$OH)$_2$, morpholino, piperidino, N-phenylamino, N-(2-, 3- or e-sulfophenyl)-amino, N-toluidino and N-(2,4- or 2,5-disulfophenyl)-amino.

Interesting reactive radicals Z are also those of the formula

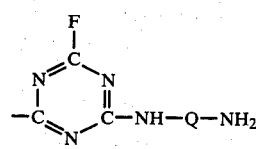

wherein Q represents an aliphatic or aromatic bridge member. Such radicals Z can be further substituted by 2,4,6-trifluoro-1,3,5-triazine to produce a radical of the formula

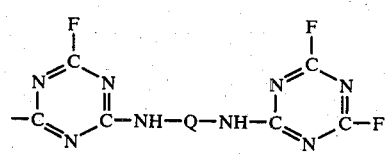

which can finally be reacted with an amine. Suitable amines are for example ammonia, methylamine, ethylamine, dimethylamine, diethylamine, ethanolamine, diethanolamine, morpholine, piperidine, 2-, 3- or 4-aminotoluene, metanilic acid, sulfanilic acid, aniline, N-methylaniline, 4-aminobenzylsulfonic acid, 2-, 3- or 4-aminobenzoic acid, naphthylaminomono-, -di- and -trisulfonic acids as well as dyes which contain amino groups, for example of the monoazo or polyazo, phthalocyanine, formazane, anthraquinone, stilbene, oxazine, dioxazine, triphenylmethane, nitro or azomethine series.

Suitable diamines which introduce the radical of the formula -HN-Q-NH$_2$ are for example: ethylene diamine, 1,3-diaminopropane, 1,6-diaminohexane, 1,3- and 1,4-phenylenediamine, 1,3-phenylenediamine-4-sulfonic acid 1,4-phenylenediamine-2-sulfonic acid, 2,4-diaminotoluene, 4,4'-diaminodiphenyl-2,2'-disulfonic acid, 4,4'-diamino-diphenyl urea-2,2'-disulfonic acid, 2,6-diaminonaphthalene-4,8-disulfonic acid, 4,4'-diamino-diphenyl ether and 2,5-diaminobenzoic acid.

Also of interest are mono-, di- or trihalopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulfo- or -5-mono-, -di- or trichloromethyl- or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloropyridazon-6'-yl-1')-phenylsulfonyl- or -carbonyl, β-(4',5'-dichloropyridazon-6'-yl-1')-ethylcarbonyl, N-methyl-N'-(2,4-dichlorotriazinyl-6)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulfonyl)-aminoacetyl, N-methyl-N-(2,3-dichloroquinoxaline-6-carbonyl)-aminoacetyl, as well as the corresponding bromine and fluorine derivatives of the above chlorine-substituted heterocyclic radicals, examples of which are 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; triazinyl radicals which contain sulfonyl groups, such as 2,4-bis-(phenylsulfonyl)-triazinyl-6, 2-(3'-carboxyphenyl)-sulfonyl-4-chlorotriazinyl-6-, 2-(3'-sulfophenyl)-sulfonyl-4-chlorotriazinyl-6-, 2,4-bis-(3'-carboxyphenylsulfonyl)-triazinyl-6; pyrimidine rings which contain sulfonyl groups, such as 2-carboxymethylsulfonyl-pyrimidinyl-4, 2-methylsulfonyl-6-methylpyrimidinyl-4, 2-methylsulfonyl-6-ethyl-pyrimidinyl-4, 2-phenylsulfonyl-5-chloro-6-methyl-pyrimidinyl-4, 2,6-bis-methylsulfonyl-pyrimidinyl-4, 2,6-bis-methylsulfonyl-5-chloropyrimidinyl-4, 2,4-bis-methylsulfonyl-pyrimidine-5-sulfonyl, 2-methylsulfonyl-pyrimidinyl-4, 2-phenyl-sulfonylpyrimidinyl-4, 2-trichloromethylsulfonyl-6-methyl-pyrimidinyl-4, 2-methylsulfonyl-5-chloro-6-methyl-pyrimidinyl-4, 2-methylsulfonyl-5-bromo-6-methyl-pyrimidinyl-4, 2-methylsulfonyl-5-chloro-6-ethyl-pyrimidinyl-4, 2-methylsulfonyl-5-chloro-6-chloromethyl-pyrimidinyl-4, 2-methylsulfonyl-4-chloro-6-methylpyrimidine-5-sulfonyl, 2-methylsulfonyl-5-nitro-6-methyl-pyrimidinyl-4, 2,5,6-tris-methylsulfonyl-pyrimidinyl-4, 2-methylsulfonyl-5,6-dimethyl-pyrimidinyl-4, 2-ethylsulfonyl-5-chloro-6-methyl-pyrimidinyl-4, 2-methylsulfonyl-6-chloro-pyrimidinyl-4, 2,6-bis-methylsulfonyl-5-chloropyrimidinyl-4, 2-methylsulfonyl-6-carboxypyrimidinyl-4, 2-methylsulfonyl-5-sulfopyrimidinyl-4, 2-methylsulfonyl-6-carbomethoxy-pyrimidinyl-4, 2-methylsulfonyl-5-carboxy-pyrimidinyl-4, 2-methylsulfonyl-5-cyano-6-methoxypyrimidinyl-4, 2-methylsulfonyl-5-chloropyrimidinyl-4, 2-sulfoethylsulfonyl-6-methyl-pyrimidinyl-4, 2-methylsulfonyl-5-bromo-pyrimidinyl-4, 2-phenylsulfonyl-5-chloro-pyrimidinyl-4, 2-carboxymethylsulfonyl-5-chloro-6-methyl-pyrimidinyl-4, 2-methylsulfonyl-6-chloropyrimidine-4- and -5-carbonyl, 2,6-bis(methylsulfonyl)-pyrimidine-4- or -5-carbonyl, 2-ethylsulfonyl-6-chloropyrimidine-5-carbonyl, 2,4-bis-(methylsulfonyl)-pyrimidine-5-sulfonyl-, 2-methylsulfonyl-4-chloro-6-methylpyrimidine-b 5-sulfonyl or -carbonyl; triazine groups which contain ammonium groups, such as 2-trimethylammonium-4-phenylamino- or -4-(o-, m- or p-sulfophenyl)-aminotriazinyl-6, 2-(1,1-dimethylhydrazinium)-4-phenylamino- or -4-(o-, m- or p-sulfophenyl)-aminotriazinyl-6, 2-(2-isopropylidene-1,1-dimethyl)-hydrazinium-4-phenylamino- or -4-(o-, m- or p-sulfophenyl)-aminotriazinyl-6, 2-N-aminopyrrolidinium- or 2-N-aminopiperidinium-4-phenylamino- or -4-(o-, m- or p-sulfophenyl)-aminotriazinyl-6, and 4-phenylamino- or 4-(sulfophenylamino)-triazinyl-6 radicals, to which the 1,4-bis-azabicyclo-[2,2,2]octane or 1,2-bis-aza-bicyclo-[0.3.3]-octane is attached in the 2-position through a quaternary nitrogen bond, 2-pyridinium-4-phenylamino- or -4-(o-, m- or p-sulfophenyl)-aminotriazinyl-6 radicals as well as corresponding 2-oniumtriazinyl-6 radicals which are substituted in the 4-position by alkylamino, such as methylamino, ethylamino or β-hydroxyethylamino groups, or by alkoxy groups, such as methoxy or ethoxy groups, or by aryloxy groups, such as phenoxy or sulfophenoxy groups; 2-chlorobenzthiazole-5- or -6-carbonyl or 2-chlorobenzthiazole-5- or -6-sulfonyl, 2-arylsulfonyl- or 2-alkylsulfonylbenzthiazole-5- or -6-carbonyl or -5- or -6-sulfonyl derivatives, such as 2-methylsulfonyl- or 2-ethylsulfonylbenzthiazole-5- or -6-sulfonyl- or -carbonyl, 2- phenylsulfonyl-benzthiazole-5- or -6-sulfonyl or -carbonyl derivatives and the corresponding 2-sulfonyl-benzthiazole-5- or -6-carbonyl or s-sulfonyl derivatives which contain sulfo groups in the fused benzene ring, 2-chlorobenzoxazole-5- or -6-carbonyl- or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methylthiazole-(1,3)-5-carbonyl or -4- or -5-sulfonyl, N-oxide of 4-chloro- or 4-nitroquinoline-5-carbonyl.

Reactive groups of the aliphatic series may also be mentioned, for example mono-, di- or trichloroacryloyl radicals or mono- or dibromoacryloyl radicals, for example dibromopropionyl, —CO—CH═CH—Cl, —COCCl═CH$_2$, —CO—CCl═CH—CH$_3$, and —CO—CCl═CH—COOH, —CO—CH═C-Cl—COOH, β-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutane-carbonyl-1 or -sulfonyl-1, β-(2,2,3,3-tetrafluorocyclobutyl-1)-acryloyl, α- or β-bromoacryloyl, α- or β-alkyl- or arylsulfonylacryloyl, such as α- or β-methylsulfonylacryloyl.

On account of their ready accessibility, particularly interesting compounds are those of the formula (1), wherein R$_1$ or R$_2$ is hydrogen, but most particularly those wherein both R$_1$ and R$_2$ are hydrogen.

The compounds of the formula

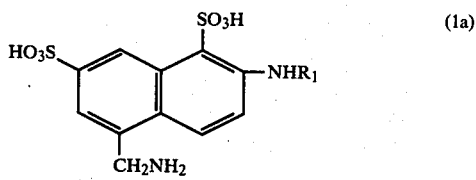

are obtained by reacting compounds of the formula

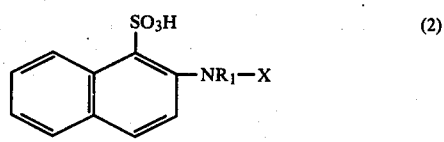

wherein X is hydrogen or an acyl radical, by the Tscherniak-Einhorn reaction with N-methylolamides, N-methylolimides, alkyl ethers of N-methylolamides or N-methylolimides, N-halomethyl amides, N-halomethyl imides, N,N-methylene-bis-amides, N,N-alkylidene-bis-amides or mixtures of formaldehyde or formaldehyde derivatives and amides or nitriles in acid medium, preferably concentrated sulfuric acid, subsequently sulfurating with oleum and finally saponifying the resulting 2-amino- or 2-acylamino-5-acylaminomethyl-naphthalene-1,7-disulfonic acids. Suitable reagents of the above mentioned kind are, for example, N-methylolchloroacetamide, N-methylolbenzamide, N-methylolacetamide, N-methylolphthalamide, N-methyl-N-methylolacetamide, N-methylol-4-chlorobenzamide, N-methoxymethylbenzamide, N-chloromethylbenzamide, N-chloromethylphthalimide, N,N'-methylene-bis-chloroacetamide.

The oleum used for the sulfuration preferably has a concentration of 20 to 40%. The methylolation and sulfuration are advantageously carried out without isolating the intermediate in the same reaction mixture. The saponification in alkaline medium, advantageously at a temperature above 100° C., is not carried out until after the sulfuration. Possible acyl groups X are in particular low molecular alkanoyl groups, especially the acetyl group. The term "low molecular" in this connection denotes radicals containing 1 to 4 carbon atoms. It will be readily understood that it also possible first to prepare the 5-aminomethyl-2-aminonaphthalene-1-sulfonic acid and then to sulfurate this latter with oleum.

The compounds of the formula

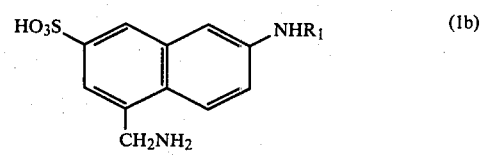

are obtained from the corresponding compounds of the formula (1a) by desulfonating these latter in an acid medium. This is expediently accomplished by heating the compounds of the formula (1a) in a dilute acid, for example by boiling them in about 2 N hydrochloric acid. R$_1$ has the same meaning in the formulae (1a) and (1b) as in formula (1).

If the aminomethyl group in the compounds of the formulae (1a) and (1b) is to be converted into a fibre-reactive acylamino group, this can be accomplished by known methods by acylating the intermediate of the formula (1a) or (1b). Preferably, however, the 5-aminomethylnaphthalenes are used for the dyestuff production and an acyl group is introduced into the azo dye first.

The dyestuff intermediates of the formula (1), (1a) or (1b) have a very wide utility, as they can be used both as diazo and coupling components. Accordingly, they can be used for a large number of azo dyes of the most widely different kind, both for fibre-reactive and non-reactive types.

The azo dyes obtained with the compounds of the formula (1) as coupling components have the formula

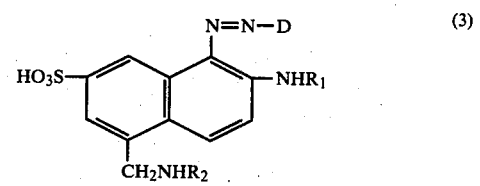

wherein D is the radical of any diazo component and R$_1$ and R$_2$ are as defined for formula (1), whilst those obtained with the compounds of the formula (1) as diazo components have the formula

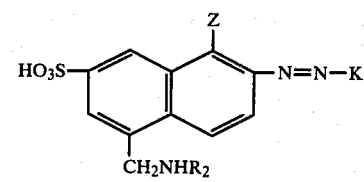

wherein K is the radical of any coupling component and Z and R$_2$ are as defined for formula (1).

If $R_2$ is a hydrogen atom, this latter can be replaced by acylation by one of the fibre-reactive acyl radicals referred to hereinabove.

As coupling components, it is possible to use both the disulfo compounds of the formula (1a) and the monosulfo compounds of the formula (1b) obtained therefrom by desulfonation. The desulfonation of the disulfo compounds in the 1-position is carried out preferably direct in the coupling mixture.

The radical D in the dyes of the formula (3) is preferably derived from diazo components of the benzene or naphthalene series or from heterocyclic diazo components, for example aminoquinolines or aminopyrazoles. It can carry in particular water-solubilising groups, such as sulfonamide and sulfone groups as well as preferably sulfo groups, and also fibre-reactive acylamino groups, especially the aforementioned, and in addition the customary non-ionogenic substituents, in particular halogen, most particularly, however, chlorine or bromine, nitro, low molecular alkyl, preferably methyl, low molecular alkoxy, preferably methoxy, trifluoromethyl, low molecular alkanoylamino, such as acetylamino, benzoylamino, low molecular alkylsulfonyl, such as methylsulfone, aryl, such as phenyl, and the cyano group. The radical D can also contain metallisable groups, such as the OH or COOH group. Eligible sulfonamide groups are in the particular the sulfamoyl groups and sulfamoyl which is mono- or disubstituted by low molecular alkyl or sulfamoyl which is mono- or disubstituted by β-hydroxyethyl.

Preferably, D is a diazo component of the benzene series which can contain not more than three of the following substituents: nitro, chlorine, methyl, sulfo, acetylamino, α-chloroacetylamino, α,β-dibromopropionylamino or α-bromoacryloylamino.

Examples of conventional diazo components are: aniline, o-, m- and p-toluidine, o-, m- and p-chloroaniline, 2,5-dichloroaniline, 2,5-dimethylaniline, 5-nitro-2-aminoanisole, 4-aminodiphenyl, anthranilic acid, aniline-2-, -3- or -4-sulfonic acid, aniline-2,5-disulfonic acid, 4-chloro-5-methylaniline-2-sulfonic acid, 5-chloro-4-methylaniline-2-sulfonic acid, 3-acetylaminoaniline-6-sulfonic acid, 4-acetylaminoaniline-2-sulfonic acid, 4-chloroaniline-2-sulfonic acid, 3,4-dichloroaniline-6-sulfonic acid, 4-methylaniline-2-sulfonic acid, 3-methylaniline-6-sulfonic acid, 2,4-dimethoxyaniline-6-sulfonic acid, 4-methoxyaniline-2-sulfonic acid and 5-methoxyaniline-2-sulfonic acid, 2,5-dichloroaniline-4-sulfonic acid, α-naphthylamine, 4-aminobenzenesulfonamide, 2-naphthylamine-4,8- and -6,8-disulfonic acid, 1-naphthylamine-2-, -4-, -5-, -6- or -7-monosulfonic acid, 1-naphthylamine-3,6-disulfonic acid, 2-naphthylamine-3,6- and -5,7-disulfonic acid, 2-naphthylamine-3,6,8-trisulfonic acid, m- and p-nitroaniline, 4-nitroaniline-2-sulfonic acid, 3-nitroaniline-6-sulfonic acid, m- or p-aminoacetanilide, 4-benzoylaminoaniline-2-sulfonic acid, 4-(α,β-dibromopropionylamino)-aniline-2-sulfonic acid, 4- or 5-chloro-2-aminophenol, 4- or 5-nitro-2-aminophenol, 6-nitro-2-aminophenol-4-sulfonic acid, 4-nitro-2-aminophenol-6-sulfonic acid, 4-methyl-6-nitro-2-aminophenol, 1-amino-2-hydroxynaphthalene-4-sulfonic acid.

These dyes are manufactured in known manner by diazotising amines of the formula

$$D-NH_2, \qquad (5)$$

wherein D is the radical of a coupling component, and coupling them to compounds of the formula (1), and, if desired or necessary, subsequently acylating any free amino groups present in the azo compound. A free amino group is in this connection in particular the —$CH_2$—$NH_2$ group if $R_2$ in the compound of the formula (1) is hydrogen, and suitable acylating agents are those which introduce one of the aforementioned acylating agents.

The radical K in dyes of the formula (4) can be derived for example from coupling components selected from the series of the aminobenzenes, aminonaphthalenes, hydroxynaphthalenes, aminohydroxynaphthalenes, acylaminohydroxynaphthalenes, arylaminohydroxynaphthalenes, pyrazolones, aminopyrazoles, pyridones and acetoacetamides. Particularly interesting coupling components are aminonaphtholsulfonic acids, naphthylaminesulfonic acids, naphtholsulfonic acids, 1-aryl-3-methylpyrazol-5-one, and acetoacetanilides. From the very large number of possible coupling components, selective mention may be made of the following: 1-amino-2-sulfo-5-acetylamino-benzene, 2-amino-5,6- or 7-sulfo-naphthalene, 2-amino-5,7-disulfo-naphthalene, 2-amino-3,6-disulfo-naphthalene, 1-amino-6- or 7-sulfonaphthalene, 1-amino-3-acetylamino-benzene, 1-amino-3-ureidobenzene, 1-amino-3-methylbenzene, 1-amino-3-methyl-6-methoxybenzene, 1-amino-2,5-dimethoxybenzene, 1-hydroxy-5-sulfonaphthalene, 1-hydroxy-3,6-disulfonaphthalene, 1-hydroxy-3,7-disulfonaphthalene, 1-hydroxy-3,8-disulfonaphthalene, 1-hydroxy-4,6-disulfonaphthalene, 1-hydroxy-4,7-disulfonaphthalene, 1-hydroxy-4,8-disulfonaphthalene, 1-hydroxy-3,6-disulfonaphthalene, 1-hydroxy-8-benzoylamino-3,6-disulfonaphthalene, 1-hydroxy-8-benzoylamino-3,5-disulfonaphthalene, 1-hydroxy-8-ureido-3,6-disulfonaphthalene, 1-hydroxy-8-ureido-3,5-disulfonaphthalene, 1-hydroxy-8-acetylamino-3,5-disulfonaphthalene, 1-hydroxy-8-acetylamino-3,6-disulfonaphthalene, 1-hydroxy-7-amino-3-sulfonaphthalene, 1-hydroxy-7-phenylamino-3-sulfonaphthalene, 1-hydroxy-8-amino-3,6-disulfonaphthalene, 1-hydroxy-8-amino-3,5-disulfonaphthalene, 1-hydroxy-7-amino-3,6-disulfonaphthalene, 1-hydroxy-6-amino-3-sulfonaphthalene, 1-hydroxy-6-amino-3,5-disulfonaphthalene, 1-sulfobenzene-[1-azo-7]-8-amino-1-hydroxy-3,6-disulfonaphthalene, 3- sulfobenzene-[1-azo-7]-8-amino-1-hydroxy-3,5-disulfonaphthalene, 4-nitro-2-sulfobenzene-[1-azo-7]-8-amino1-hydroxy-3,6-disulfonaphthalene, 1-(2′, 3′- or 4′-sulfophenyl)-3-methylpyrazolone-5, 1-(2′-chloro-4′- or 5-sulfophenyl)-3-methylpyrazolone-5, 1-(2′-methyl-4′-sulfophenyl)-3-methylpyrazolone-5, 1-(2′-methyl-4′-sulfophenyl)-3-carboxypyrazolone-5, 1-β-carboxyethyl-3-carboxy-1-[4′,8′-disulfonaphthyl-(2)]-3-methylpyrazolone-5, 1-[5′,7′-disulfonaphthyl-(2)]-3-methylpyrazolone-5, 1-(2′-chloro-5′-sulfophenyl)-3-methyl-5-aminopyrazole, 1-(2′-chloro-4′-sulfophenyl)-3-methyl-5-aminopyrazole, 1-(3′-or 4′-sulfophenyl)-3-methyl-5-amino-pyrazole, 1-carboxymethyl-3-methyl-pyrazolone-5, 1-β-carboxyethyl-3-methyl-pyrazolone-5, 1-β-carboxyethyl-3-methyl-5-aminopyrazole, 1-(4′-sulfophenyl)-3-carboxy-pyrazolone-5.

If the monoazo dyes obtained with the above coupling components still contain diazotisable amino groups, these can also be diazotised by a conventional method and reacted again with a suitable coupling component to produce disazo dyes. A suitable coupling component for the reaction with the diazotised monoazo dye can be, for example, one of the compounds listed above.

A further possibility of synthesising disazo dyes of the aforementioned kind consists in producing monoazo dyes which still contain couplable positions and then combining these in a second coupling step, using 5-aminomethyl-2-aminonaphthalene-1,7-disulfonic acid for the first or second coupling step. Coupling components used for the synthesis of such monoazo dyes are in particular those of the series of the dihydroxybenzenes, dihydroxynaphthalenes and aminohydroxynaphthalenes. In addition to the components already mentioned, 1,3-dihydroxybenzene and 1,3-dihydroxynaphthalene-5,7-disulfonic acid may be cited as examples. Diazo components which can be used for the synthesis of such diazo dyes are inter alia: 1-amino-4-sulfobenzene, 1-amino-3-sulfobenzene, 1-amino-2-chloro-5-sulfobenzene, 1-amino-2-sulfo-4-nitrobenzene, 1-amino-2,5-disulfobenzene, 1-amino-4-nitrobenzene, 1-amino-4-methylsulfonyl-benzene, 2-amino-4,8-disulfonaphthalene, 2-amino-6,8-disulfonaphthalene.

These dyes are obtained in a manner known per se by diazotising a compound of the formula (1), wherein $R_1$ represents hydrogen, and coupling the diazonium salt to a compound of the formula

H—K        (6)

wherein K is the radical of a coupling component.

The introduction of the reactive groups is accomplished, if desired, by reacting the free amino group in dyes of the general formula

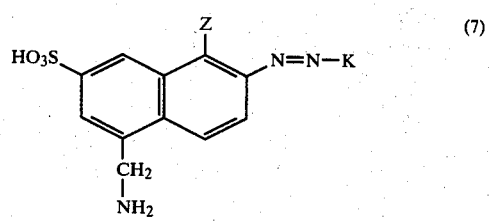

(7)

with an acylating agent, preferably one that introduces one of the aforementioned fibre-reactive radicals.

The dyes of the formulae (3) and (4) are suitable for dyeing and printing material that contains hydroxyl or amide groups, such as textile fibres and filaments and fabrics made of wool, silk, synthetic polyamide and polyurethane fibres, and for the washfast dyeing and printing of natural or regenerated cellulose. The treatment of cellulose fabrics is advantageously carried out in the presence of acid acceptors and, if desired, with the application of heat, by the methods customarily employed for reactive dyes.

The invention is illustrated by the following Examples, in which the parts are by weight. The relationship between parts by weight and parts by volume is the same as that between gram and cubic centimeter.

EXAMPLE 1

Process for the manufacture of 5-aminomethyl-2-aminonaphthalene-1,7-disulfonic acid 26.5 parts of 2-acetylaminonaphthalene-1-sulfonic acid are added at 15° to 20° C. to 100 parts by volume of concentrated sulfuric acid and the mixture is stirred until a solution forms. Then 17.7 parts of N-methylolphthalimide are added at 15°–20° C., and stirring is continued at room temperature until a thin-layer chromatogram shows the presence of no more starting material (about 24 hours). Then 65% oleum is added at 25°–40° C. until there is a 25% excess of $SO_3$. The reaction mixture is kept at 50°–65° C. until a thin-layer chromatogram shows that the reaction is complete. The solution is subsequently cooled to room temperature and poured onto 1200 parts of ice. The intermediate is precipitated by the addition of KCl, removed by filtration and washed with a portion of KCl solution. The filter residue is stirred in 100 parts by volume of water and the pH is adjusted to 7 with concentrated NaOH. Then further NaOH is added until an approx. 10% lye is obtained and the resulting solution is treated in an autoclave for 1 hour at 170° C., whereupon the acetyl group and the phthaloyl group are split off. The cooled reaction mass is adjusted to pH 7 with concentrated hydrochloric acid and sodium chloride is added to bring the precipitation to completion. The precipitate is washed with a portion of sodium chloride solution and dried in vacuo at 50°–60° C., affording 23.2 parts of a faintly yellow substance.

Analysis (calculated for 5-aminomethyl-2-aminonaphthalene-1,7-disulfonic acid with 1 mole of water of cyrstallisation):

calculated: C: 37.7%, H: 4.0%, N: 8.0%, S: 18.28%, found: C: 37.9%, H: 4.1%, N: 8.4%, S: 18.1%.

The 100 MHz proton resonance spectrum of the substance in a solution of dimethyl sulfoxide/$D_2O$ confirms the presumed structure of the formula

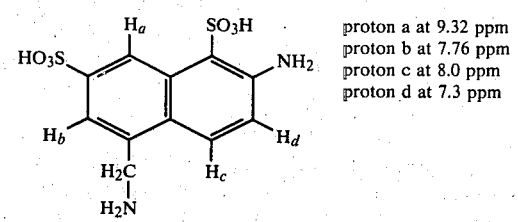

proton a at 9.32 ppm
proton b at 7.76 ppm
proton c at 8.0 ppm
proton d at 7.3 ppm

EXAMPLE 2

While cooling with water, 37.8 g of 5-aminomethyl-2-aminonaphthalene-1-sulfonic acid are added at 25°–30° C. to 150 parts by volume of 25% oleum and the mixture is stirred for 1 hour until a solution is obtained. The reaction mixture is then brought to 50°–53° C. and kept for 30 hours at this temperature. It is subsequently cooled to room temperature and poured onto 1000 parts of ice. The precipitated product is removed by filtration, washed with 450 parts by volume of ice-water and alcohol respectively, and dried in vacuo at 50°–60° C. in vacuo, affording 43.7 parts of a virtually colourless substance. The IR spectrum shows the compound to be identical with that obtained in Example 1.

EXAMPLE 3

Process for the manufacture of 5-aminomethyl-2-aminonaphthalene-7-sulfonic acid.

16.6 parts of 5-aminomethyl-2-aminonaphthalene-1,7-disulfonic acid are stirred under reflux for 30 hours in 300 parts by volume of about 2 N normal hydrochloric acid. Stirring is continued for a further 12 hoursat room temperature and the batch is then filtered. The filter cake is washed with 20 parts of water and dried in vacuo at 50°–60° C., affording 13.01 parts of virtually colourless substance in the form of the hydrochloride. Analysis of the recrystallised product gives the following values:

calculated: C: 52.37%, H: 4.8%, N: 11.1%, S: 12.71%, found: C: 52.4%, H: 5.0%, N: 10.9%, S: 12.5%.

The 100 MHz proton resonance spectrum of the substance in a solution of dimethyl sulfoxide indicates the following structure:

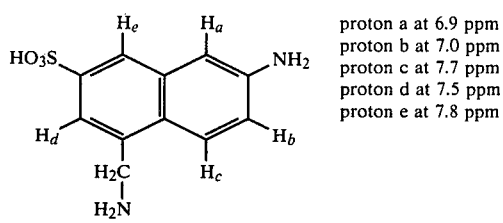

proton a at 6.9 ppm
proton b at 7.0 ppm
proton c at 7.7 ppm
proton d at 7.5 ppm
proton e at 7.8 ppm

EXAMPLE 4

Diazotisation 2.07 parts of 2,6-dichloro-4-nitroaniline are dissolved in 8 parts by volume of concentrated sulfuric acid and the solution is diazotised at room temperature with 1.62 parts by volume of 41.5% nitrosylsulfuric acid. After a time, the diazotisation mixture is poured on ice.

Coupling 3.32 parts of 5-aminomethyl-2-aminonaphthalene-1,7-disulfonic acid are dissolved in 50 parts of water by neutralising the solution with sodium hydroxide. The above solution of the diazonium salt is added and coupling is carried out at room temperature. The precipitated dye is collected by filtration and washed with water.

Acylation

The dyestuff paste is stirred in a mixture of 250 parts of water and 50 parts by volume of acetone and the pH is adjusted to 10. Then 3.37 parts of trifluorochloropyrimidine are added dropwise at 35°–45° C. and the pH of the mixture is kept constant at 10 with sodium hydroxide solution. The mixture is then neutralised and the precipitated dye is collected by filtration, washed and dried, affording 5.2 parts of the dye of the formula

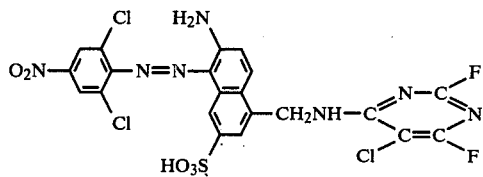

which colours synthetic polyamide in fast, deep purplish red shades.

EXAMPLE 5

Diazotisation 1.73 parts of aniline-2-sulfonic acid are diazotised in 50 parts of water at 0° to 5° C. in the presence of 2.5 parts by volume of concentrated hydrochloric acid with 10 parts by volume of 1 N sodium nitrite. The reaction mixture is stirred briefly and any excess nitrite is destroyed with sulfamic acid.

Coupling 2.52 parts of 5-aminomethyl-2-aminonaphthalene-7-sulfonic acid are mixed in powder form with the above diazonium salt. Coupling is carried out at 20°–40° C. and the dye is precipitated neutral by the addition of sodium chloride.

Acylation

The filter cake is taken up in 100 parts of water with stirring and the solution is cooled. The pH of the solution is adjusted to 9 and kept constant thereat with sodium hydroxide during the dropwise addition of 5 parts of α,β-dibromopropionyl chloride. When the reaction is complete, the solution is evaporated to dryness, affording 10.65 parts of the orange dye of the formula

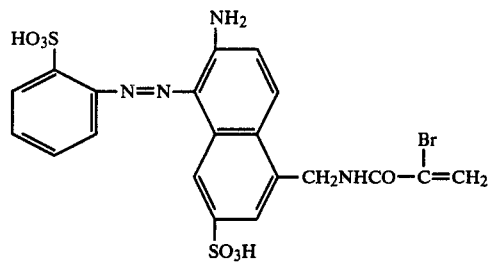

which dyes wool in fast shades.

The dyes of Examples 6 to 16 in Table 1 which dye wool, synthetic polyamide or cellulose in the shades indicated in column V, are obtained by the above procedure using the diazo components listed in column II instead of aniline-2-sulfonic acid and coupling them to the coupling components of column III, and using the acylating agents of column IV instead of α,β-dibromopropionyl chloride.

TABLE 1

| I Example | II Diazo component | III Coupling component | IV Acylating agent | V Shade |
|---|---|---|---|---|
| 6 | NH₂, SO₃H, NO₂ (structure) | HO₃S—naphthalene—CH₂NH₂, SO₃H (structure) | Cl, F, F pyrimidine (structure) | deep purplish red |

TABLE 1-continued

| I Example | II Diazo component | III Coupling component | IV Acylating agent | V Shade |
|---|---|---|---|---|
| 7 | 3-amino-2,5-dichlorobenzenesulfonic acid (NH₂, Cl, Cl, SO₃H) | 8-amino-5-sulfo-2-(aminomethyl)naphthalene (NH₂, HO₃S, CH₂NH₂, SO₃H) | 5-chloro-2,4,6-trifluoropyrimidine | orange |
| 8 | 2-aminobenzene-1,4-disulfonic acid (NH₂, SO₃H, SO₃H) | 8-amino-5-sulfo-2-(aminomethyl)naphthalene (NH₂, HO₃S, CH₂NH₂, SO₃H) | 5-chloro-2,4,6-trifluoropyrimidine | red |
| 9 | 4-amino-(N-2,3-dibromopropionyl)aniline (NH₂, NH—COCHBr—CH₂Br) | 7-amino-2-(aminomethyl)-5-sulfonaphthalene (NH₂, CH₂NH₂, SO₃H) | CH₂Br—CHBr—COCl | orange |
| 10 | 2-amino-4-benzamidobenzenesulfonic acid (SO₃H, NH₂, HNCO—C₆H₅) | 7-amino-2-(aminomethyl)-5-sulfonaphthalene (NH₂, CH₂NH₂, SO₃H) | (CH₃CO)₂O | orange |
| 11 | 4-amino-2-(dibromopropionylamino)-5-sulfobenzenesulfonic acid (NH₂, SO₃H, HO₃S, NH—COCHBr—CH₂Br) | 7-amino-2-(aminomethyl)-5-sulfonaphthalene (NH₂, CH₂NH₂, SO₃H) | CH₂Br—CHBr—COCl | scarlet |
| 12 | 4-amino-2-(dibromopropionylamino)-5-sulfobenzenesulfonic acid (NH₂, SO₃H, HO₃S, NH—COCHBr—CH₂Br) | 7-amino-2-(aminomethyl)-5-sulfonaphthalene (NH₂, CH₂NH₂, SO₃H) | 5-chloro-2,4,6-trifluoropyrimidine | scarlet |
| 13 | 2-amino-4-benzamidobenzenesulfonic acid (SO₃H, NH₂, HN—CO—C₆H₅) | 7-amino-1-(aminomethyl)-3-sulfonaphthalene (NH₂, CH₂—NH₂, SO₃H) | C₆H₅—CO—Cl | orange |
| 14 | 2-amino-5-benzamidobenzenesulfonic acid (SO₃H, NH₂, HN—CO—C₆H₅) | 7-amino-1-(aminomethyl)-3-sulfonaphthalene (NH₂, CH₂—NH₂, SO₃H) | CH₃—SO₂—Cl | orange |
| 15 | 2-amino-5-acetamidobenzenesulfonic acid (SO₃H, NH₂, HN—CO—CH₃) | 7-amino-1-(aminomethyl)-3-sulfonaphthalene (NH₂, CH₂—NH₂, SO₃H) | C₆H₅—CO—Cl | orange |

TABLE 1-continued

| I Example | II Diazo component | III Coupling component | IV Acylating agent | V Shade |
|---|---|---|---|---|
| 16 | (structure: benzene with SO₃H, NH₂, and HN–CO–CH₃ substituents) | (structure: naphthalene with NH₂, –CH₂–NH₂, and SO₃H substituents) | CH₃–(phenyl)–SO₂–Cl | orange |

EXAMPLE 17

2.67 parts of the dye obtained by coupling diazotised 2-amino-5-nitrophenol to 5-aminomethyl-2-aminonaphthalene-7-sulfonic acid are dissolved in 100 parts of water at boiling temperature with the addition of 4 parts by volume of 2 N sodium hydroxide. After addition of 11.5 parts by volume of a chromosalicyclic acid solution containing 17.2 g of chromium per liter, the mixture is stirred for 4 hours at reflux temperature. The somewhat gelatinous mass is diluted with 150 parts of hot water, adjusted to a pH value of 10.5 with 2 N sodium hydroxide, and then filtered at the boil. The dye is precipitated with sodium chloride, collected by filtration and washed with sodium chloride solution.

The dyestuff paste is dissolved at room temperature in 100 parts of water and the solution is adjusted to a pH value of 9.5 with 2 N acetic acid. Then 5 parts of α,β-dibromopropionyl chloride are added dropwise in the course of 1 hour, while simultaneously keeping a constant pH value of 9.5 with 2 N sodium hydroxide. The dye is precipitated with sodium chloride, collected by filtration, washed with sodium chloride solution and dried at 50°–60° C., affording 2.09 parts of the dye of the formula

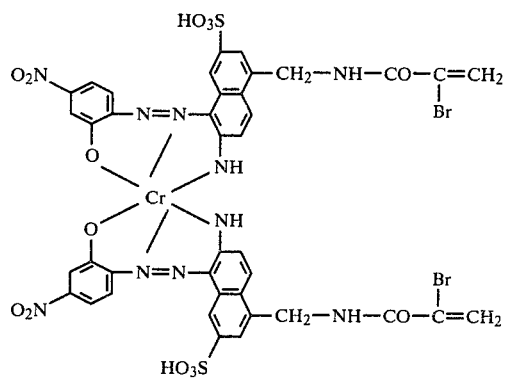

which dyes natural or synthetic polyamide material in grey to black shades.

EXAMPLE 18

5.15 parts of the 1:1 chromium complex dye obtained from nitrodiazooxy acid, coupled to β-naphthol, and 4.13 parts of the metal-free acetyl derivative obtained from 5-nitro-2-aminophenol, coupled to 5-aminomethyl-2-aminonaphthalene-7-sulfonic acid, are stirred in 100 parts of water and heated to 80° C. At this temperature, a constant pH value of 7 is established with 2 N sodium hydroxide solution in the course of about 1½ hours. The residue is collected by filtration at room temperature and evaporated to dryness. Extraction with alcohol yields 6.2 parts of the dye of the formula

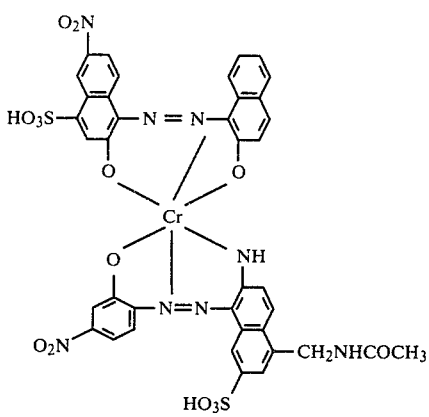

which dyes natural or synthetic polyamide material in grey to black shades.

EXAMPLE 19

Diazotisation 3.32 parts of 5-aminomethyl-2-aminonaphthalene-1,7-disulfonic acid are dissolved neutral in 50 parts of water and diazotisation is carried out at 0°–4° C. with 10 parts by volume of 1 N sodium nitrite in the presence of hydrochloric acid. A small excess of nitrite is destroyed with sulfamic acid after a time.

Coupling 1.74 parts of 1-phenyl-3-methylpyrazolone-5 are dissolved in 50 parts of water by adding 5 parts by volume of 2 N sodium hydroxide solution and the solution is cooled. A pH range of 8 to 10 is kept with sodium hydroxide solution during the addition of the diazonium salt. When the coupling is complete, the product is collected by filtration and washed with sodium chloride solution.

Acylation

The dyestuff paste is stirred in 250 parts of water and cooled. Then 5 parts of α,β-dibromopropionyl chloride are added dropwise at about 10° C. and the pH of the reaction mixture is kept at 9.5 with sodium hydroxide solution. The mixture is subsequently warmed until the dye dissolves. The dye is then precipitated with sodium chloride and dried, affording 6.12 parts of the dye of the formula

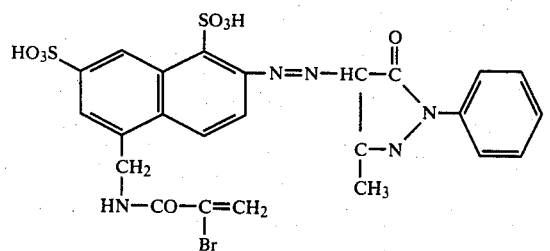

The dye of the formula

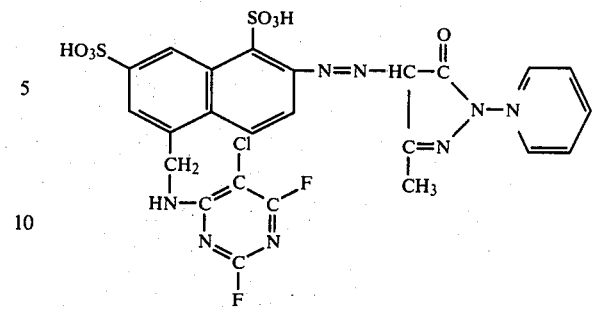

is obtained by virtually the same procedure using trifluorochloropyrimidine instead of α,β-dibromoprionyl chloride.

The dyes of Examples 20 to 36 in Table 2 which dye wool, polyamide or cellulose in the shades indicated in column V are obtained by repeating the procedure of this Example using the coupling components listed in column III instead of 1-phenyl-3-methylpyrazolone-5, and the diazo components of column II instead of 5-aminomethyl-2-aminonaphthalene-1,7-disulfonic acid, and acylating with the acylating agents of column IV.

TABLE 2

| I Example | II Diazo component | III Coupling component | IV Acylating agent | V Shade |
|---|---|---|---|---|
| 20 | HO₃S-naphthalene-SO₃H, NH₂, CH₂NH₂ | H₂C-CO-pyrazolone-N-phenyl, C=N, CH₃ | tetrafluoro-chloropyrimidine | yellow |
| 21 | HO₃S-naphthalene-SO₃H, NH₂, CH₂NH₂ | HO, NHCO-phenyl, naphthalene-SO₃H, SO₃H | CH₂Br—CHBR—COCl | red |
| 22 | HO₃S-naphthalene-SO₃H, NH₂, CH₂NH₂ | HO, NHCO-phenyl, naphthalene-SO₃H, SO₃H | trifluoro-chloropyrimidine | red |
| 23 | HO₃S-naphthalene-SO₃H, NH₂, CH₂NH₂ | HO-naphthalene-SO₃H | CH₂Br—CHBr—COCl | scarlet |
| 24 | HO₃S-naphthalene-SO₃H, NH₂, CH₂NH₂ | HO-naphthalene-SO₃H | tetrafluoro-chloropyrimidine | scarlet |
| 25 | HO₃S-naphthalene-SO₃H, NH₂, CH₂NH₂ | NH₂-naphthalene-OH-SO₃H | tetrafluoro-chloropyrimidine | red |

TABLE 2-continued

| Example | Diazo component | Coupling component | Acylating agent | Shade |
|---|---|---|---|---|
| 26 | 7-amino-2-sulfo-5-(aminomethyl)naphthalene (HO$_3$S at 2, NH$_2$ at 7, CH$_2$NH$_2$ at 5) | 1-hydroxy-6-sulfo-7-(NHCO—CHBr—CH$_2$Br)naphthalene | CH$_2$Br—CHBr—CO—Cl | red |
| 27 | 2-amino-1-sulfo-7-sulfo-5-(aminomethyl)naphthalene | 7-amino-4-hydroxy-6-sulfo-2-naphthalene (NH$_2$, HO, SO$_3$H) | C$_6$H$_5$—COCl | red |
| 28 | 2-amino-1-sulfo-7-sulfo-5-(aminomethyl)naphthalene | 1-hydroxy-6-sulfo-7-(NHCOCHBrCH$_2$Br)naphthalene | CH$_2$Br—CHBr—COCl | red |
| 29 | 2-amino-1-sulfo-7-sulfo-5-(aminomethyl)naphthalene | 1-hydroxy-6-sulfo-7-(NHCOCHBrCH$_2$Br)naphthalene | 5-chloro-2,4,6-trifluoropyrimidine | red |
| 30 | 2-amino-1-sulfo-7-sulfo-5-(aminomethyl)naphthalene | 8-hydroxy-3,6-disulfo-1-[NH—(4-chloro-6-amino-1,3,5-triazin-2-yl)]naphthalene | CH$_2$Br—CHBr—COCl | red |
| 31 | 2-amino-1-sulfo-7-sulfo-5-(aminomethyl)naphthalene | 8-hydroxy-3,6-disulfo-1-[NH—(4-chloro-6-amino-1,3,5-triazin-2-yl)]naphthalene | 5-chloro-2,4,6-trifluoropyrimidine | red |
| 32 | 2-amino-1-sulfo-7-sulfo-5-(aminomethyl)naphthalene | 1-hydroxy-3-sulfo-7-(NHCO—CHBr—CH$_2$Br)naphthalene | Cl—CH$_2$COCl | red |
| 33 | 2-amino-1-sulfo-7-sulfo-5-(aminomethyl)naphthalene | 4-methyl-6-hydroxy-3-carbamoyl-1-ethyl-2-pyridone | 2,4-difluoro-6-methoxy-1,3,5-triazine | yellow |
| 34 | 2-amino-1-sulfo-7-sulfo-5-(aminomethyl)naphthalene | 7-amino-2-sulfo-naphthalene (NH$_2$, SO$_3$H) | 2,4-difluoro-6-methylamino-1,3,5-triazine | orange |
| 35 | 2-amino-1-sulfo-7-sulfo-5-(aminomethyl)naphthalene | 1-hydroxy-3-sulfo-6-[N(CH$_3$)—COCHBrCH$_2$Br]naphthalene | 2,4-difluoro-6-(2-methoxyethylamino)-1,3,5-triazine | scarlet |

TABLE 2-continued

| I Example | II Diazo component | III Coupling component | IV Acylating agent | V Shade |
|---|---|---|---|---|
| 36 | HO₃S—[naphthalene]—SO₃H, NH₂, CH₂NH₂ | [phenyl]—NH₂, NHCONH₂ | 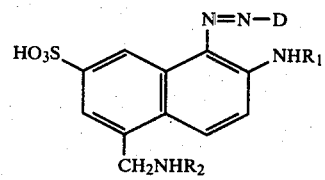 | yellow |

Dyeing Procedure I 10 parts of wool are dyed at a temperature of 98° C. for 30 to 90 minutes in an aqueous liquor containing, based on the weight of the fabric, 4% by weight of ammonium sulfate, 1.5% by weight of 80% acetic acid, 1% by weight of a substituted alkylaminopolyglycol ether and 2% by weight of the dye of Example 20. The dyebath is then cooled to 80° C., neutralised by adding 2.5% by weight of 25% aqueous ammonia, and the goods are subjected to an aftertreatment for 15 minutes at this temperature. The dyed wool is then removed from the bath and washed and dried in the conventional manner. The wool is dyed in a pure yellow shade of good general fastnes properties.

Dyeing Procedure II 3 parts of the dye obtained in Example 24 are dissolved in 100 parts of water while adding 0.5 part of sodium m-nitrobenzenesulfonate. A cotton fabric is impregnated with the resulting solution to a liquor pick-up of 75% and then dried.

The fabric is then impregnated with a warm solution of 20° C. which contains, per liter, 30 ml of an aqueous 30% sodium hydroxide solution and 250 parts of sodium chloride, and squeezed out to a pick-up of 75%. The dyeing is steamed for 60 seconds at 100° to 103° C., rinsed, soaped for a quarter of an hour in a 0.1% boiling solution of a non-ionic detergent, rinsed and dried. A scarlet cotton fabric is obtained.

Dyeing Procedure III 3 parts of the dye obtained in Example 22 are dissolved in 100 parts of water while adding 1 part of sodium m-nitrobenzenesulfonate. A cotton fabric is impregnated with the resulting solution to a liquor pick-up of 75% and then dried.

The fabric is then impregnated with a warm solution of 20° C. which contains, per liter, 30 ml of an aqueous 30% sodium hydroxide solution and 250 parts of sodium chloride, and squeezed out to a pick-up of 75%. The dyeing is steamed for 60 seconds at 100° to 103° C., rinsed, soaped for a quarter of an hour in a 0.1% boiling solution of a non-ionic detergent, rinsed and dried. A scarlet cotton fabric is obtained.

Dyeing Procedure IV 10 parts of Helanca jersey are dyed in an aqueous liquor of 500 ml which contains 1 g/l of monosodium phosphate and is adjusted to pH 6 with disodium phosphate. The amount of dye of Example 10 is 2%, based on the weight of the fabric. The dyeing time at a temperature of 98° is 30 to 90 minutes. The dye fabric is removed from the bath and washed and dried in the usual way. A pure orange dyeing of very good general fastness properties is obtained.

What is claimed is:

1. Azo dyes of the formula

[structure: naphthalene with HO₃S, N=N—D, NHR₁, CH₂NHR₂]

wherein D represents the radical of a diazo component, $R_1$ represents hydrogen, an alkyl radical of 1 to 8 carbon atoms or a phenyl radical, and $R_2$ represents hydrogen or an acyl radical.

2. Azo dyes according to claim 1, wherein D is a radical of the benzene, naphthalene, pyrazole or quinoline series.

3. Azo dyes according to claim 1, wherein D is a radical of the benzene or naphthalene series which can carry one or more of the following substituents: sulfo, sulfonamide, alkylsulfonyl, fibre-reactive acylamino groups, chlorine, bromine, nitro, alkyl, alkoxy, trifluoromethyl, alkanoylamino, benzoylamino, aryl, cyano, hydroxyl or carboxyl groups.

4. Azo dyes according to claim 1, wherein D is the radical of a diazo component which carries a water-solubilising group and which may or may not carry a fibre-reactive acyl radical.

5. Azo dyes according to claim 1, wherein D carries a hydroxyl or carboxyl group in the ortho-position to the azo group.

6. Azo dyes according to claim 1, wherein D is a diazo component of the benzene series which can contain 1 to 3 of the following substituents: nitro, chlorine, methyl, sulfo, acetylamino, α-chloroacetylamino, α,β-dibromopropionylamino or α-bromoacryloylamino.

* * * * *